United States Patent [19]
Erdmann

[11] 3,747,036
[45] July 17, 1973

[54] MAGNETIC LINE SENSOR
[75] Inventor: David P. Erdmann, Hopkins, Minn.
[73] Assignee: Honeywell, Inc., Minneapolis, Minn.
[22] Filed: Jan. 17, 1972
[21] Appl. No.: 218,102

[52] U.S. Cl.............. 336/84, 324/41, 336/181, 336/234
[51] Int. Cl. ........................................ H01f 15/04
[58] Field of Search............... 336/233, 234, 173, 336/174, 175, 221, 229, 84, 180, 181; 174/115; 324/41, 43, 47

[56] References Cited
UNITED STATES PATENTS

| | | | |
|---|---|---|---|
| 3,541,432 | 11/1970 | Scarbrough | 324/43 |
| 3,319,161 | 5/1967 | Beynon | 324/47 |
| 2,885,646 | 5/1959 | Bugg | 336/234 X |
| 2,975,384 | 3/1961 | Geiser | 336/229 X |
| 2,520,991 | 9/1950 | Yolles | 174/115 X |
| 3,527,095 | 9/1970 | Wada | 336/234 X |
| 3,489,974 | 1/1970 | Montross | 336/174 |
| 499,852 | 6/1893 | Pfannkoche | 336/234 X |
| 3,437,967 | 4/1969 | Josse | 336/174 X |

Primary Examiner—Thomas J. Kozma
Attorney—Charles J. Ungemach and Albin Medved

[57] ABSTRACT

A magnetic intrusion line sensor in the form of a single flexible cable for easy installation in a narrow trench. The sensor is fabricated by winding a coil of sensing wire around a core of multi-strand magnetic wire, the sensing wire winding being reversed in direction at predetermined intervals to provide cancellation of far-field noise, while enhancing the signal caused by the local magnetic disturbance.

10 Claims, 6 Drawing Figures

MAGNETIC LINE SENSOR

BACKGROUND OF THE INVENTION

1. Field of the Invention

The present invention relates to magnetic line sensors for use in detecting magnetic field disturbances. In particular, the sensor according to the present invention is intended for detection of intrusions across an extended line of many feet in length, such as the perimeter of a restricted area. The magnetic sensor described and claimed herein is a passive open loop device which in generation of the output signal requires no active elements.

2. Description of the Prior Art

The prior art of magnetic field detectors is predominantly comprised of point sensors having a relatively limited range, such as, for example, illustrated in U.S. Pat. No. 3,541,432 to Scarbrough. Designing a system which would detect magnetic disturbances along an extended line, such as the perimeter of a military base, for example, using the prior art magnetic field detectors would require extremely large number of such detectors and very complex electronics. The passive nature of the present device enhances the reliability of the system and minimizes the need for maintenance as well as making it difficult to detect.

A passive system which has been used successfully to some extent in the recent past, is a so-called "transposed loop" sensor. The transposed loop is comprised of a conductive wire arranged to form large loops having precise dimensions, both as to their length and their width. The problem with the transposed loop system is that it requires precise measurement at the time of installation and, when the sensor is buried underground, requires a wide excavation, leaving a large scar thus making the implantation of the sensor highly visible. Furthermore, since the geometry of the loops is critical, obstacles may not be easily avoided.

SUMMARY OF THE INVENTION

The present invention provides a passive magnetic line sensor assembly in a single, small diameter cable that can be readily deployed in a variety of security system applications. The basic transducer consists of flexible magnetic core fabricated by stranding together specially annealed magnetic wire, and a segmented sense winding which is wound around the core in such a way as to enhance the detection process for localized magnetic disturbances and to simultaneously provide a first order rejection of non-localized magnetic disturbances (background noise). Analysis of the field measurements of the sensitivity of the transducer according to the present invention indicate that it compares favorably with that provided by the transposed loop transducer. Three important parameters directly effecting this sensitivity are the length of the transducer, the permeability of the core material, and the number of turns comprising the sensing winding.

An intruder carrying ferromagnetic material in the proximity of the sensor will influence only a portion of the continuous magnetic line. An important design consideration, therefore, is to determine how long each segment of the sense winding should be to adequately couple legitimate signals into the transducer and yet provide adequate rejection of far-field effects. The influence on the magnetic field within the sensor is a function of the flux lines coupling the intruding magnetic object with the sensor. This coupling can be represented in terms of a total included angle extending from the intruding magnetic object and subtending a portion of the sensor. A small included angle results in a small influence. As the total included angle increases, the total value of the magnetic field in the line also increases. At a point of about 30° the rate of increase in the field is slowed down. At about 70° the total field begins to decrease. This results from a reversal of the direction of flux lines emanating from the intruding object dipole at the greater angles. This characteristic indicates that the region directly under the dipole has a magnetic flux direction opposite to that in adjacent segments outside of the region of influence. In view of this phenomena the sensing winding of the transducer according to the present invention is electrically segmented (between 30° and 70°), and the adjacent segments are connected in series in opposite polarity. In another embodiment, the adjacent segments could be connected in parallel with identical signal-to-noise ratio. For the average type of intrusion, the length of each segment should be between 8 and 12 feet. When the intruding object is directly over the center of a specific segment of the transducer, a signal enhancement (rather than interference) effect will result because of the fact that the flux in adjacent segments will be in the opposite direction. Since these adjacent segments are connected in opposite polarity to the segment under consideration, the resulting signals will be additive. The inherent rejection of far-field non-intruding object phenomena, however, will still be properly effected because these phenomena are not localized, but blanket the entire magnetic line sensor as further explained with reference to the preferred embodiment.

The permeable core in the magnetic transducer concentrates the flux lines within the core. A measure of sensor effectiveness is the effective permeability which relates core material flux density with external field intensity. Because the transducer construction of the present invention is very long and thus provides a very high length to diameter (L/D) ratio for the transducer material, the realized core permeability is in essence the permeability of the material itself. With proper design and control, the gain provided by the magnetic permeability can be maximized to produce a more effective system and a higher signal-to-noise ratio. However, care must be used to insure that the specific core material can be predicted and controlled.

The maximum transducer length is dependent upon the realized signal-to-noise ratio. Experimental data indicates that a sensor according to the present invention may be a section of 100 meters or more in length, comprising of approximately 40 alternately reversed winding segments. Several succeeding 100-meter sections may be connected in one continuous line by bringing the signal wires from each section back to a central processing point. The signal from the sensor is applied to a low frequency band-pass amplifier, having low noise and high gain characteristics, to boost the signal to a usable level. Signal processing electronics may be connected to the output of the amplifier to generate a visual or audio signal in response to the intrusion, or to control some other function, such as a counter.

It is therefore an object of the present invention to provide a magnetic intrusion line sensor which is essentially a single flexible cable and can thus be installed in a single narrow trench and can easily avoid natural obstructions.

A further object of the present invention is to provide a magnetic line sensor which is less susceptible to handling and installation damage and has more resistance to environment.

Still a further object of the present invention is to provide a magnetic line sensor having higher sensitivity and higher signal-to-noise ratio and also to provide better cancellation of far-field noise.

BRIEF DESCRIPTION OF THE DRAWINGS

A better understanding of the specific nature of the present invention, as well as other objects, advantages, and uses thereof, will become apparent from the following detailed description with the accompanying drawings, in which.

DESCRIPTION OF THE PREFERRED EMBODIMENT

Figure 1:
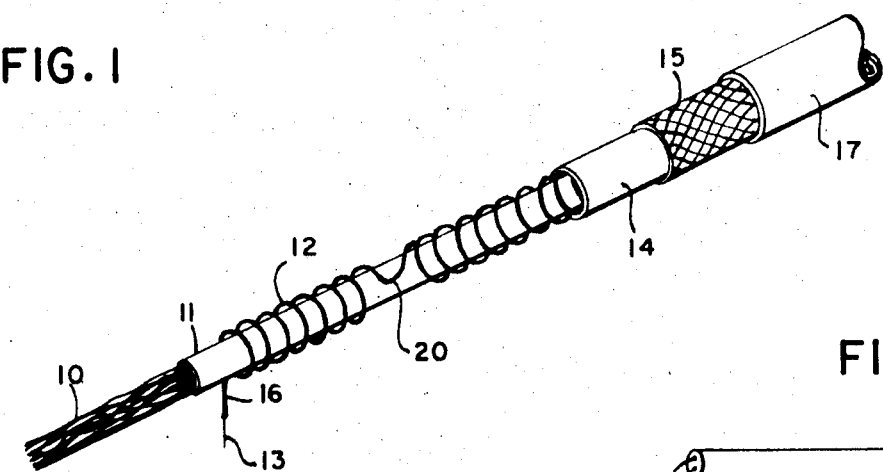
FIG. 1 is a cut-away view of a magnetic intrusion line sensor according to the preferred embodiment of the present invention.

Referring to FIG. 1, a cut-away view of the transducer according to the present invention is illustrated. A flexible stranded wire magnetic core 10 is located at the center of the transducer cable. By using a stranded core, the cold working of the material and loss of permeability as a result of handling during installation is minimized. The core material should have a final-material permeability of approximately 1,200. In one of the embodiments of the invention the core was constructed of seven strands of 0.042 inch diameter magnetic alloy wire containing 80 percent nickel, 15 percent iron and 5 percent molybdenum. In another embodiment, 19 strands were used to give a greater sensitivity. Other materials will be found suitable for this purpose by those skilled in the art. The flexible magnetic core is surrounded by an insulative layer 11, over which is wound a sensing coil 12. Sensing coil 12 is constructed of a conductive wire, whose winding direction is reversed, as shown at 20, every 8 to 12 feet. In the preferred embodiment, the sensing coil is constructed of approximately 60 turns per inch of AWG 30 copper magnetic wire. To prevent excessive stress in the sensing winding during the loading of the sensor assembly, a special crushable fabric insulation 16 is added to the magnetic wire. Surrounding sensing coil 12 is a second insulative wrapping 14, which in turn is surrounded by an electrostatic shield 15. The purpose of the electrostatic shield is to protect the transducer from external noise. Additionally, the metallic nature of the electrostatic shield provides protection from rodents. Insulative layers 11 and 14 may be constructed of polyethelene or other suitable material, while the electrostatic shield could typically be constructed of silver or tin plated copper wire, or other suitable material. The entire combination is finally surrounded by a protective jacket 17 to provide a water-tight sheath and abrasion protection. Polyethelene or comparable material may be used for this purpose.

The stranding of the core material provides the required flexibility while maintaining adequate permeability of the core material (controlled cold working). The purpose of the magnetic core is to concentrate local disturbances of the ambient magnetic field produced by an intruding object. As the object crosses the line, a portion of the field distortion caused by the object will couple with the magnetic core within the cable. This results in a disturbance that is localized to that region of the cable which magnetically couples with the intruding object. A voltage signal is obtained from the output terminal of the sensing winding. For proper operation of the sensor, it is important that it be able to distinguish between valid localized intrusions and environmental influences not caused by intruding objects. This is accomplished by the winding technique used in the construction of the sensor, which employs a specially segmented winding serving two purposes. First, it provides a first order rejection of far-field phenomena and second, it enhances the signal produced during an intrusion.

First order rejection of far-field effects is achieved by connecting adjacent segments in opposing polarity. The rejection results from the addition of equal but opposite signals, hence no output. In reality, all fields have gradients and, therefore, the rejection can never be complete. It is always only first order. Additional rejection may be achieved by additional signal processing.

Figure 5:
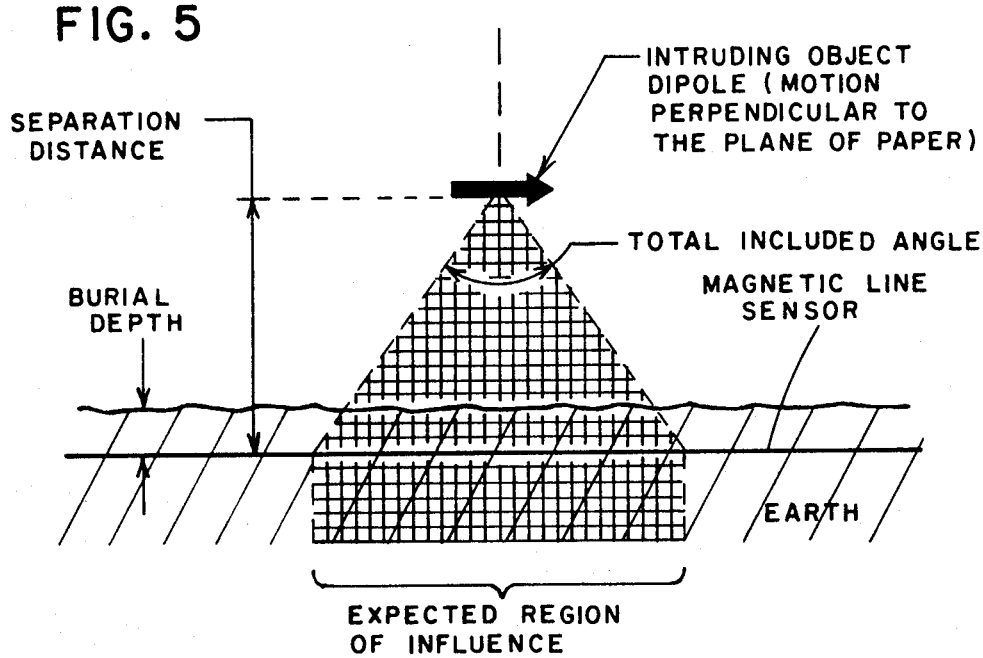
FIG. 5 is a graphical representation of the relationship between the magnetic line sensor and the intruding magnetic object.
Figure 6:
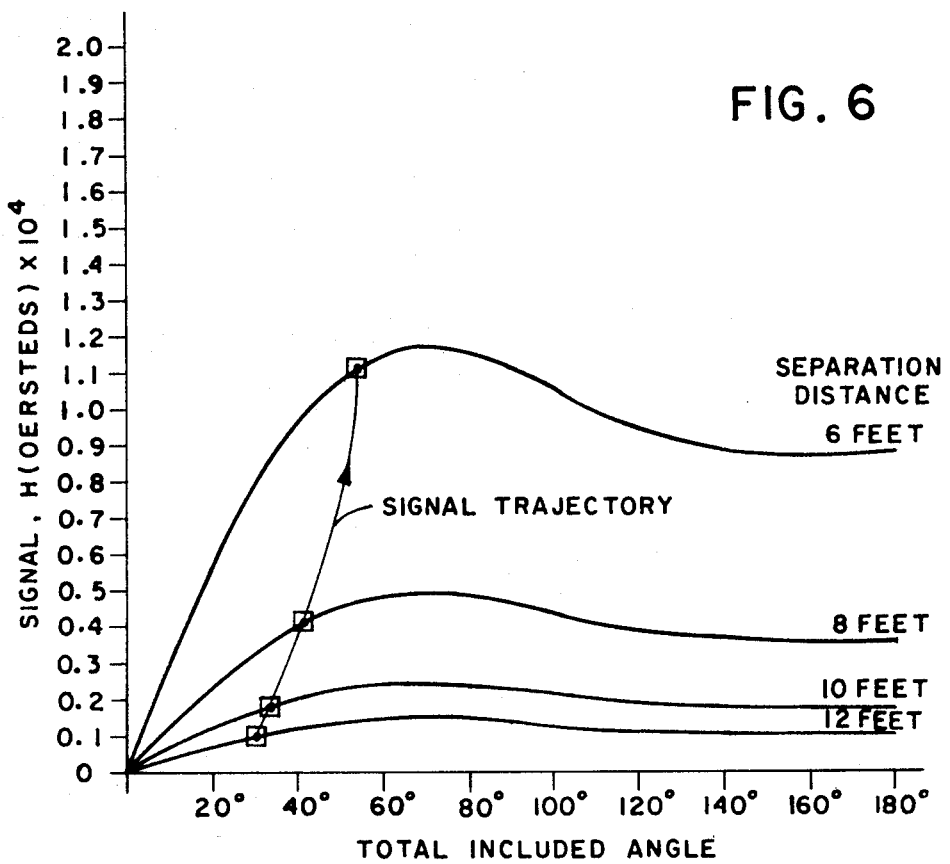
FIG. 6 is a graphical representation of the field variation as a function of separation distance and the angle subtended by a typical intruding object.

Signal enhancement during a valid intrusion results from the fact that the direction of the field directly under a magnetic dipole is of opposite polarity than that observed at large axial distances in either direction. This can be more easily visualized by aid of FIG. 4. Thus, if the segments are properly proportioned and electrically connected in opposite sense, the signal produced in adjacent segments can be made to enhance the total signal rather than interfere with it. For optimum operation of the magnetic intrusion line sensor of the present invention it is, therefore, important to determine the optimum length of each segment of the winding to adequately couple legitimate signals into the transducer and yet provide appropriate gradiometer action for far-field rejection. As a general rule, for far-field rejection purposes, it is desirable to have each section as short as possible. For detection purposes, the length of each section should be as long as possible. The graphical representation in FIG. 5 of the relationship between the magnetic line sensor and the intruding magnetic object is helpful in connection with this discussion. The two critical variations in the relationship between the sensor and the intruding object are the separation distance and the total included angle. As expected, a small included angle results in a small influence. As the total included angle increases, the total value of the magnetic field (H) in the line sensor also increases. FIG. 6 illustrates graphically the variation of the magnetic field in the line with the total included angle for various separation distances between the line sensor and the intruding magnetic object.

Figure 4:
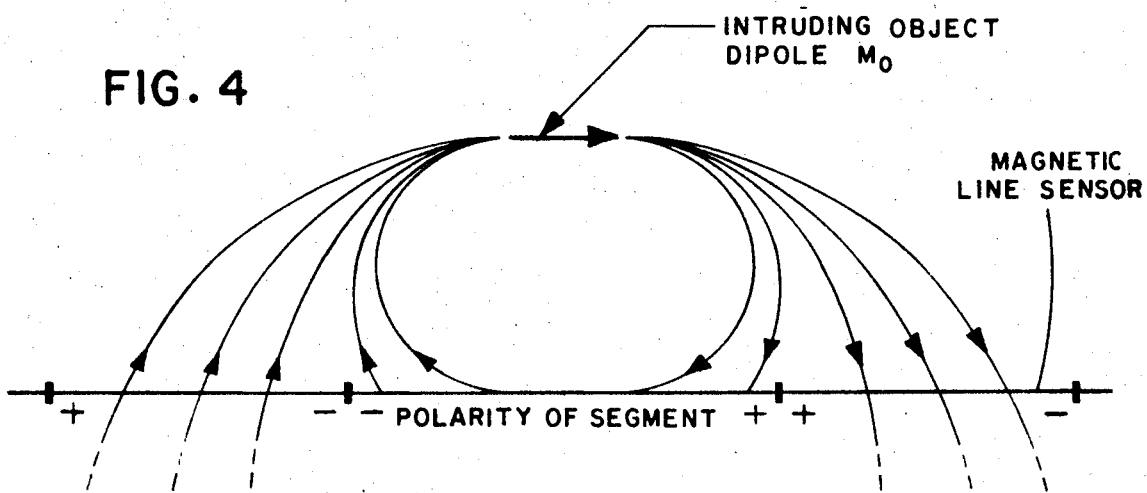
FIG. 4 is a graphical representation of the magnetic field disturbances created by a magnetic object positioned in the vicinity of a magnetic line sensor of the present invention.

With the increasing angle, a point is reached where the rate of increase in the field is reduced. This occurs at about 30°. A second point at about 70° is reached where the total field begins to decrease. This results from a reversal of the direction of flux lines emanating from the intruding object at greater angles. It can thus be seen that the region directly under the magnetic dipole of the intruding object has a magnetic flux direction opposite to that in an adjacent segment outside of the region of influence. This suggests that the sensing winding should be electrically segmented between 30° and 70°, and that the adjacent segments should be connected in opposite polarity. In terms of segment length, for the average type of intrusion, calculations indicate that the length of each segment should be between 8 and 12 feet. When the intruding object is directly over the center of a specific segment of the sensor, a signal enhancement will result because of the fact that the flux in adjacent segments will be in opposite directions, as shown in FIG. 4. Since these adjacent segments are connected in opposite polarity to the segment under consideration, their signals will be added. The inherent rejection of far-field phenomena, however, will still be properly effected because these phenomena are not localized, but blanket the entire line sensor.

Referring again to FIGS. 5 and 6 of the drawings, it can be seen that during an intrusion the separation distance decreases and the included angle increases. Thus the signal increases as shown in the "signal trajectory" in FIG. 6, which is referenced to a line segment subtending a total angle of 30° at 12 foot separation distance. This suggests that the angle selected should be closer to 30° as opposed to 70° to realize the greatest increase in signal as the intruder approaches, i.e., to operate on the increasing portion of the curves on the left of the peak as shown in FIG. 6.

Figure 2:
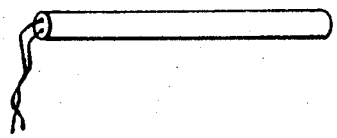
FIG. 2 illustrates a magnetic intrusion line sensor according to the present invention comprised of a single section.
Figure 3:
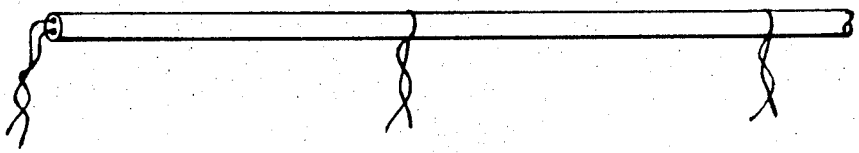
FIG. 3 illustrates a magnetic intrusion line sensor according to the present invention, comprised of a plurality of sections.

The calculations indicate that the sensitivity of a typical segment of the sensor as shown in FIG. 1 is 0.07 volt-sec/oersted (H). For a 100-meter line section, approximately 40 segments are required. Actual field data shows that, for a typical intrusion, the peak-to-peak voltage of one section is about 2.5 micro-volts, which is well in the range of useful signal. It has thus been demonstrated that a single line sensor having satisfactory signal-to-noise ratio and providing useful output voltage can be constructed in lengths exceeding 100 meters. A single such section may be utilized as shown in FIG. 2. If a longer sensor is needed, a number of such sections can be constructed end to end on the same continuous core material, by picking up signals at points approximately 100 meters or more apart, as illustrated in FIG. 3.

Appropriate electronics, not shown, may be used to amplify and process the signal generated by the magnetic line sensor described herein. Such electronics may include a low frequency band-pass amplifier, having low noise and high gain characteristics, to boost the signal to a more practical level. Where several succeeding 100-meter sections are utilized, these may be connected together by bringing the signal wires from each section back to a central data processing point.

A specific preferred embodiment of the invention was illustrated and described in this specification. It is understood, however, that many design variations are possible within the spirit of the invention and are intended to come within the scope of the appended claims.

I claim:

1. A passive magnetic intrusion line sensor comprising:
   an open loop flexible magnetic core having a very high length to diameter ratio;
   a sensing winding of conductive wire positioned about said core, said winding being comprised of a plurality of first polarity segments and an equal plurality of reversed polarity segments arranged alternately with segments of said first polarity, said alternate segments connected in series to form a single continuous winding along said core; and
   a protective sheath surrounding said sensing winding.

2. Apparatus according to claim 1, wherein said magnetic core is constructed of stranded magnetic wire.

3. Apparatus according to claim 2, wherein a first layer of insulative material is positioned between the core and the sensing winding and a second layer of insulative material is positioned about said sensing winding.

4. Apparatus according to claim 3, wherein an electrostatic shield is positioned about said second layer of insulative material.

5. Apparatus according to claim 4, wherein a protective jacket of polyethelene is positioned about said electrostatic shield.

6. Apparatus according to claim 1, wherein said sensing winding is comprised of segments between 8 to 12 feet in length, adjacent segments being wound in reverse polarity sense.

7. Apparatus according to claim 1, wherein said sensing winding is constructed of wire surrounded by crushable insulation.

8. Apparatus according to claim 1, wherein said sensing winding is constructed of AWG 30 copper magnetic wire surrounded by crushable insulation.

9. Apparatus according to claim 8, wherein said winding is comprised of approximately 60 turns per inch.

10. Apparatus according to claim 1, wherein said sensing winding is comprised of 40 segments of alternately reversed polarity, each said segment being between 8 to 12 feet in length.

* * * * *